3,784,707
TREATMENT AND CONTROL OF MILK FAT DEPRESSION IN LACTATING COWS

Jerry W. Young, Ames, Iowa, assignor to Iowa State University Research Foundation, Inc., Ames, Iowa
No Drawing. Filed Mar. 3, 1972, Ser. No. 231,728
Int. Cl. A61k 27/00
U.S. Cl. 424—343                           8 Claims

ABSTRACT OF THE DISCLOSURE

A method of treatment or control of milk-fat depression in lactating cows wherein 1,3-butanediol is orally administered to the cows. The method is particularly useful where the lactating cows are being fed a high energy, low roughage ration.

BACKGROUND OF THE INVENTION

It is well known that the composition of milk can be changed by altering the diet of lactating cows. This is particularly significant with milk fat which is very sensitive to dietary changes, and less significant but also true of protein. Further, in the dairy industry the price of milk is based upon the milk fat content therein. Consequently any depression of fat production in milk cattle results in a severe economic loss to dairymen.

Additionally, it is known that diets which decrease the fat content tend to simultaneously increase the protein content of milk. Other changes attributed to such diets are (1) lowered rumen pH, (2) reduced acetate-propionate ratio in the rumen; (3) increased unsaturated fatty acids in milk fat and (4) a reduction in blood lipid levels. Diets that alter milk composition in this way will hereafter be referred to as "fat-depressing diets" and can be characterized by low roughage and high grain content in the feed. However, the present invention is not limited to this characterization in that the method herein is capable of producing beneficial results with any diet that decreases fat in the milk.

Heretofore several substances have been employed by dairymen to alleviate milk fat depression without altering the fat-depressing diet. Among these are sodium bicarbonate, magnesium oxide and bentonite. These agents prevent or correct milk fat depression by altering the physiological changes that cause it. However, appetite depression seems to accompany these treatments which is a serious limitation in high producing cows.

It is therefore an object of the present invention to provide a method of treatment and control of milk fat depression in lactating cows being fed a fat-depressing diet without substantially altering said diet. A further object is to provide such a method that does not depress the feed intake of the lactating cows. Other objects and benefits of the present invention will become apparent upon reading the remaining specification and claims.

DESCRIPTION OF THE INVENTION

The method of this invention can be used for both treatment and prevention of milk fat depression in dairy cattle. In general, therefore, the method provides a means for controlling milk fat depression in lactating dairy cattle. In practicing the method, a milk fat depression controlling effective amount of 1,3-butanediol (BD) is orally administered to the lactating cows. In a preferred embodiment of the invention the 1,3-butanediol is administered as an additive to the fat-depressing diet being fed to the cattle. This addition can be accomplished in a number of ways. The BD can be added to protein supplements such as the commercially available soybean or cottonseed meal supplements. It may also be convenient to add the BD to a liquid dairy cattle feed or feed supplement. Alternatively, the BD can be sprayed onto dry dairy cattle rations, such as ground corn, or onto hay or other roughage to be consumed by the cattle. This invention is not limited to any particular mode of feeding or addition of the BD to dairy cattle rations or ration composites.

The required quantities of BD administered to the dairy cattle can be controlled in relation to body weight. Generally for control of milk fat depression an amount of BD over 0.3 pound (lb.) per 100 pounds body weight of said cows per 24 hours will not be required. With amounts ranging from 0.01 up to 0.2, or if necessary up to 0.3 lb. BD per 100 lbs. body weight of said cows per 24 hours effective control will uusally be maintained. In exceptional cases, the dosage can be increased further, as in treatment of conditions requiring immediate corrections. For example, a method of treating milk fat depression in lactating cows being fed a fat-depressing diet may comprise orally administering up to 0.5 lb. of 1,3-butanediol per 100 lbs. body weight of said cows per 24 hours. One preferred embodiment of such a treatment procedure is to administer BD in an amount of from 0.1 to 0.2, or if necessary up to 0.3 lb. per 100 lbs. body weight of said cows per 24 hours. For prevention with certain diets, some benefits can be obtained down to levels as low as 0.01 lb. BD/100 lbs. body weight/24 hours. The overall range for "control" covering both prevention and treatment) is therefore 0.01 to 0.5 lb. BD/100 lbs. body weight/24 hours.

It often occurs that cows exhibiting milk fat depression need a continuing treatment in order to achieve maximum milk fat output, even though the total amount of milk produced remains stable or even increases. Such a method can comprise administering the 1,3-butanediol in an amount up to 0.5 lb. per 100 lbs. body weight of said cows, as required for immediate correction of the milk fat depression, per 24 hours for a period of from 3 to 6 days; and thereafter, when control has been achieved, administering the 1,3-butanediol in an amount of from 0.01 up to 0.3 lb. per 100 lbs. body weight of said cows per 24 hours. In another embodiment of a continuing method, when some immediate correction is needed together with long range maintenance, the 1,3-butanediol is administered as an additive to the fat-depressing diet being fed to the cows, employing a dosage level in the first stage of from 0.1 to 0.3 lb./100 lbs. body weight/24 hrs. and a dosage level in the second stage of from 0.1 to 0.2/lb./ 100 lbs. body weight/24 hrs. The first stage treatment can range from 3 to 6 days, and the second stage control administration can continue as long as the animals are being fed a milk fat depression inducing diet.

EXAMPLES

The following examples demonstrate the beneficial results obtainable through the use of the instant invention, but they are not intended as limitations upon the method, which can be applied in many other embodiments.

Trial 1

The objective of this trial was to take a group of cows on a normal diet and producing a normal amount of milk fat, feed them a diet which depressed fat production, and then by adding BD to the fat depressing diet of half the cows to determine whether BD was effective in alleviating the depressed fat production. The controls were included to eliminate the effects of other sources of environmental variation.

Ten Holstein cows in early to midlactation were fed a normal diet for a two-week preliminary period. Then the cows were allocated to two groups of five cows each. After a slow change over period of about ten days, all cows were fed a fat depressing diet. This diet consisted of 3.5 kg. alfalfa hay/day and a flaked corn mix fed according to appetite. The fat depressing period lasted six weeks. Following this period, one group (cows 1–5) continued to be fed the fat depressing diet for seven weeks, and the other group (cows 6–10) was feed the same diet with 5% of the grain being replaced with 1,3-butanediol. The total ration, including hay, would have contained about 4% BD.

Milk samples were collected three times a week during the preliminary period and two times weekly during each of the experimental periods. Fat, total solids and protein content were determined. Milk weights were recorded for each day that samples were taken.

Jugular blood samples were taken from each cow twice during the preliminary period and three times at two-week intervals during each experimental period. Two protein-free filtrates were prepared from each sample, one by the barium:zinc method of Somogyi, "Determination of Blood Sugar," J. Biol. Chem. 160:69, and the other by the sodium tungstate:sulfuric acid method of Folin and Wu, "A System of Blood Analysis," J. Biol. Chem. 38:81. Filtrates were frozen until analyzed. The barium: zinc filtrate was analyzed for glucose by the glucose oxidase method (Worthington Biochemical Corporation). The tungstate:sulfuric filtrate was analyzed for acetone plus acetoacetate by the method of Reid, "The Determination of Ketone Bodies in Blood," Analyst 85:265, as modified by Sutton et al., "Functional Development of Rumen Mucosa," J. Dairy Sci. 46:530, and for $\beta$-hydroxybutyrate by the enzymatic method of Williamson and Mellanby, Methods of Enzymatic Analysis, p. 459.

Rumen fluid was taken from each cow with the aid of a vacuum pump. This pump was connected to a tygon tube having a stainless steel strainer attached to the end. The tube was inside a heavy steam hose. Rumen fluid, taken immediately after each individual blood sample, was collected twice during the preliminary period and three times during each experimental period. pH was determined immediately with a Corning Model 12 pH meter. Then the samples were centrifuged at 17,300 ×gravity for ten minutes, and the supernatant liquid frozen at −15° C. Later the supernatant samples were thawed, and to 5 ml. samples of the fluid 1 ml. of 25% metaphosphoric acid was added and mixed in. This mixture was centrifuged at 17,300×gravity for ten minutes, and the supernatant analyzed for volatile fatty acid content on an Aerograph Hy-Fi, Model 600, gas-liquid chromatograph.

Two control cows and one BD fed cow were omitted from the final data analysis. One control cow was late in lactation, and her milk fat percentage increased during the supposed fat depressing period. Therefore, she could not be used to test for alleviation of milk fat depression. The other control cow was inadvertently fed corn silage and her fat percent increased. The BD fed cow eliminated from the data summary became ill during the BD feeding period and went off feed. Therefore, the following discussion and data tables represent three control cows and four BD fed cows.

Milk production and milk fat content averages are given in Table 1. Total milk production and fat content were substantially different between the two groups during the preliminary period. However, since the amount of change between periods was the relevant comparison, this was not a serious weakness. Fat depression was slightly greater during the fat depressing period for the control group, but both groups showed a substantial drop. The major difference in response between groups was during the BD feeding period. The control cows showed little or no recovery in fat production while the BD fed cows had a total fat production rate nearly as high as in the preliminary period. Statistical analysis of this data indicated that the difference in response was significant at the 10% level, and just short of significance at the 5% level. Milk production was not affected very much in either group during the fat depressing or BD feeding periods. When one considers that this experiment was conducted over a three-month period when the normal lactation curve should be declining, it indicates that BD can be fed during lactation without adversely affecting milk production.

TABLE 1

[Effects on production, fat percent, fat production, protein percent, and total solids percent of milk from feeding 1,3-butanediol to cows on a fat-depressing diet]

| Group | Dietary period | | | |
|---|---|---|---|---|
| | Preliminary | Fat-depression | Comparison | |
| | | | BD fed animals | Control animals |
| (Milk production (kg./day): | | | | |
| BD fed | 18.0 | 18.5 | 19.1 | |
| Control | 21.7 | 20.9 | | 21.0 |
| Milk fat (%): | | | | |
| BD fed | 3.79 | 2.69 | 3.49 | |
| Control | 3.36 | 1.98 | | 2.07 |
| Milk fat production (kg./day): | | | | |
| BD fed | 0.68 | 0.50 | 0.67 | |
| Control | 0.72 | 0.41 | | 0.43 |
| Milk protein (%): | | | | |
| BD fed | 3.20 | 3.43 | 3.57 | |
| Control | 3.21 | 3.51 | | 3.56 |
| Total milk solids (%): | | | | |
| BD fed | 12.97 | 11.81 | 12.80 | |
| Control | 12.31 | 11.19 | | 11.49 |

Milk protein and total solids content values are also presented in Table 1. Milk protein content increased similarly during the fat depressing and BD feeding period for both groups. This agrees with the results of many other studies on fat depression. It also indicates that fat depression can be alleviated without reversing the trend toward higher protein production on a high concentrate diet. Total solids production seemed to reflect fat production quite closely in both groups.

To determine the influence of the present invention on the cow blood chemistry, analyses were conducted with the results of average concentration values for blood ketones and blood glucose given in Table 2. Feeding the fat depressing diet resulted in a decrease in total blood ketone concentration for both groups, but the response was much greater in the BD fed than in the control group. However, the BD fed group had a much higher initial average. During the BD comparison period, total ketones rose over two-fold for the BD fed group while the control group continued to decline. The ratio of acetone plus acetoacetate to $\beta$-hydroxybutyrate remained fairly constant for the control group in all three periods while in the BD fed cows, this ratio narrowed during fat depression and widened again slightly during BD feeding. These data seem to indicate that BD feeding will increase the concentration of ketone bodies in the circulating blood to levels normal for a non-fat depressing diet, with the major effect being on $\beta$-hydroxybutyrate levels.

Glucose concentrations were very similar for both the control and BD fed groups in all three periods. There was a drop in blood glucose concentration in both groups during the fat-depressing period and a recovery in both groups during the period when BD was added to the experimental group. None of the values could be considered particularly abnormal, and BD feeding seemed to have little effect on blood glucose.

TABLE 2

[Effects on total ketones, acetone plus acetoacetate, β-hydroxybutyrate' and glucose in blood from feeding 1,3-butanediol to cows on a fat-depressing diet]

| | | Dietary period | | |
|---|---|---|---|---|
| | | | Comparison | |
| Group | Prelim-inary | Fat-depres-sion | BD fed animals | Control animals |
| Total ketones (mg./100 ml.): | | | | |
| BD fed | 5.13 | 2.32 | 6.06 | |
| Control | 3.06 | 2.96 | | 1.76 |
| Acetone plus acetoacetate (mg./100 ml): | | | | |
| BD fed | 0.39 | 0.53 | 1.15 | |
| Control | 0.38 | 0.54 | | 0.21 |
| β-hydroxybutyrate (mg./100 ml.): | | | | |
| BD fed | 4.74 | 1.79 | 4.91 | |
| Control | 2.68 | 2.42 | | 1.55 |
| Glucose (mg./100 ml.): | | | | |
| BD fed | 59.2 | 43.3 | 52.4 | |
| Control | 61.6 | 42.0 | | 52.6 |

Rumen fluid pH and volatile fatty acid ratios are given in Table 3. The data here are difficult to interpret. Rumen fluid pH readings did not show the expected downward trend, being equal in all periods for controls and going up during fat depression and then down slightly during BD comparison for the BD fed group. This would be opposite to expected values when compared to the milk fat production data. During the preliminary period, volatile fatty acid concentrations were normal with molar percent acetate to propionate to butyrate being about 65:20:10, respectively. During the fat depressing period, the acetate:propionate ratio narrowed much more in the control group than it did in the BD fed group. No explanation for this difference is apparent. In the BD feeding period, acetate concentration for both groups continued to decline slightly while propionate was essentially unchanged. Butyrate concentration declined during the fat depression period and recovered during the BD feeding period for both groups.

TABLE 3

[Effects on rumen pH and volatile fatty acid ratios from feeding 1,3-butanediol to cows on a fat-depressing diet]

| | | Dietary period | | |
|---|---|---|---|---|
| | | | Comparison | |
| Group | Prelim-inary | Fat-depres-sion | BD fed animals | Control animals |
| Rumen (pH): | | | | |
| BD fed | 6.0 | 6.3 | 6.2 | |
| Control | 6.0 | 6.0 | | 6.0 |
| Acetate (molar %): | | | | |
| BD fed | 64.7 | 56.9 | 53.4 | |
| Control | 68.2 | 49.9 | | 46.2 |
| Propionate (molar %): | | | | |
| BD fed | 20.9 | 31.6 | 30.2 | |
| Control | 19.2 | 40.3 | | 40.7 |
| Butyrate (molar %): | | | | |
| BD fed | 11.2 | 7.2 | 13.6 | |
| Control | 10.3 | 4.6 | | 8.4 |

Feed intake and body weight changes are given in Table 4. No change in feed intake was caused by the addition of BD to the diet. Feed intake was more than adequate to supply energy needs in both groups. While it was a little higher for the controls compared to the BD fed group, this was to be expected based on the fact that the control animals were producing more milk. The controls gained slightly more body weight during both experimental periods, but this difference is not considered significant.

TABLE 4

[Effects on feed intake and body weight gain from feeding 1,3-butanediol to cows on a fat-depressing diet]

| | Dietary period | | |
|---|---|---|---|
| | | Comparison | |
| Group | Fat-depres-sion | BD fed animals | Control animals |
| Air-dry feed intake (kg./cow/day): | | | |
| BD fed | 14.5 | 14.5 | |
| Control | 15.9 | | 15.9 |
| Body weight change (kg./cow/day): | | | |
| BD fed | 0.19 | 0.77 | |
| Control | 0.48 | | 1.00 |

An overall view of this trial indicates that BD acts as a cure for milk fat depression from high flaked corn diets. The fat production of BD fed cows versus controls shows a definite trend in favor of BD feeding during the BD comparison period. Interpretation of the blood and rumen fluid data is not clear. Ketone production in the BD fed group was substantially higher than controls and followed previously experienced trends in other studies during alleviation of fat depression. However, there was neither a widening of the acetate to propionate ratio nor an increase in rumen pH for the BD fed group, both of which have been evident in other studies where fat depression was alleviated. Total milk production was maintained. There was nothing to indicate any adverse effect of BD on lactating cows' performance, and it was decided to try BD in an experiment to prevent fat depression using a larger number of cows.

Trial 2

The objective of this trial was to take a group of cows on a normal diet with normal fat production and feed them a fat depressing diet with or without BD added. In this way, it could determine whether BD added to the fat depressing diet would prevent fat depression. Controls were again included to eliminate other sources of environmental variation.

For two weeks ten Holstein and two Brown Swiss cows were fed the same herd diet used in Trial 1. Then they were allocated into two groups balanced according to age, stage of lactation, previous milk and milk fat production, and breed. One group (cows 1–6) was slowly changed to the fat depressing diet described in Trial 1. The other group (cows 7–12) was fed the same diet with 5% of the flaked corn mixture replaced by 1,3-butanediol (BD). The BD feeding period lasted six weeks. Then all cows were changed back to their preliminary diets for a three-week post-experimental period.

Seven milk samples were taken during the preliminary period, and samples were taken twice weekly during the experimental period. Fat, protein, and total solids content were determined as described in Trial 1. Milk weights were recorded on sample days. Blood and rumen fluid samples were collected twice during the preliminary period and four times during the experimental period. They were analyzed as previously described in Trial 1. Following the BD feeding period, milk samples were collected weekly during the three-week post-experimental period and analyzed for milk fat content. Milk weights were recorded for each sampling day.

All 12 cows continued through both periods, and all data were included in the analysis. These cows were earlier in lactation and producing at a higher level than those used in Trial 1.

Milk production and milk fat content averages are given in Table 5. Total milk production and milk fat production were nearly equal for the two groups during the preliminary period. There was a substantial difference, however, in milk fat percentage between the two groups during the last four weeks of the BD feeding period with the BD fed group having a much higher milk fat content. In addition, total milk production increased slightly for the BD fed group but declined slightly for the controls.

As a result, total fat production decisively favored the BD fed group by 0.31 kg./day during the last four weeks of the BD feeding period. This difference was statistically significant. During the post-experimental period when returned to the herd ration, both groups declined in milk production. However, fat percentage increased for both groups, and this resulted in nearly constant total fat production for the BD fed cows and a substantial recovery for the controls.

Milk protein and total solids data are also included in Table 5. Milk protein production changed very little for either group in the BD feeding period. This indicates that the positive effect BD feeding has on fat production does not significantly affect milk protein. Total solids reflected milk fat production quite closely.

TABLE 5

[Effects on production, fat percent, fat production, protein percent, and total solids percent of milk from feeding 1,3-butanediol to prevent milk fat depression]

| Group | Dietary period | | | |
|---|---|---|---|---|
| | Preliminary | Comparison[1] | | Postexperimental |
| | | BD fed animals | Control animals | |
| Milk production (kg./day): | | | | |
| BD fed | 29.3 | 30.4 | | 24.7 |
| Control | 31.3 | | 29.6 | 26.6 |
| Milk fat (percent): | | | | |
| BD fed | 3.11 | 2.67 | | 3.08 |
| Control | 3.03 | | 1.70 | 2.95 |
| Milk fat production (kg./day): | | | | |
| BD fed | 0.91 | 0.81 | | 0.76 |
| Control | 0.95 | | 0.50 | 0.85 |
| Milk protein (percent): | | | | |
| BD fed | 3.22 | 3.25 | | |
| Control | 3.30 | | 3.34 | |
| Milk total solids (percent): | | | | |
| BD fed | 11.96 | 11.54 | | |
| Control | 11.85 | | 10.66 | |

[1] Values for milk production and fat (percent) are for the last four weeks of the BD comparison period.

Values for blood ketone and blood glucose concentrations are given in Table 6. Comparison between preliminary and BD comparison periods indicate a slight drop in total ketones for the BD fed cows and a substantial drop for the control cows during the BD addition period. However, the major difference in response between the two groups was in the acetone plus acetoacetate fraction. The BD fed cows' acetone plus acetoacetate concentration increased in the BD comparison period while the controls decreased. β-hydroxybutyrate changed about the same amount for both groups.

TABLE 6

[Effects on total ketones, acetone plus acetoacetate, β-hydroxybutyrate, and glucose in blood from feeding 1,3-butanediol to prevent milk fat depression]

| Group | Dietary period | | | |
|---|---|---|---|---|
| | Preliminary | Fat-depression | Comparison | |
| | | | BD fed animals | Control animals |
| Total ketones (mg./100 ml.): | | | | |
| BD fed | 3.43 | | 3.00 | |
| Control | 2.28 | | | 1.20 |
| Acetone plus acetoacetate (mg./100 ml.): | | | | |
| BD fed | 0.59 | | 1.18 | |
| Control | 0.31 | | | 0.20 |
| β-hydroxybutyrate (mg./100 ml.): | | | | |
| BD fed | 2.85 | | 1.82 | |
| Control | 1.99 | | | 0.98 |
| Glucose (mg./100 ml.): | | | | |
| BD fed | 39.3 | | 23.0 | |
| Control | 40.2 | | | 22.3 |

Blood glucose response was similar for both groups in the BD feeding period with nearly a 50% drop for both groups. This was not expected as it did not occur to this extent in Trial 1, and cows on fat depressing diets usually increase or remain equal in blood glucose concentration. However, the cows in this trial were producing milk at a level higher than normal.

Rumen pH and volatile fatty acid values are given in Table 7. Rumen pH increased for the BD fed cows but decreased for the control cows. A logical explanation for the pH increase for the cows fed BD is not apparent. Volatile fatty acid values indicates a similar acetate: propionate response for both groups in the BD feeding period (narrowing of the acetate propionate ratio). However, individual values not shown in the averages indicate a definite trend toward a wider acetate:propionate ratio in the BD fed cows, but no such trend was apparent in the controls. Butyrate values were not greatly different between groups and declined slightly during the BD feeding period.

TABLE 7

[Effects on rumen pH and volatile fatty acid ratios from feeding, 1,3-butanediol to prevent milk fat depression]

| Group | Dietary period | | |
|---|---|---|---|
| | Preliminary | Comparison | |
| | | BD fed animals | Control animals |
| Rumen (pH): | | | |
| BD fed | 6.3 | 6.5 | |
| Control | 6.2 | | 5.9 |
| Acetate (molar percent): | | | |
| BD fed | 61.5 | 53.4 | |
| Control | 58.0 | | 49.4 |
| Propionate (molar percent): | | | |
| BD fed | 26.6 | 36.4 | |
| Control | 27.3 | | 37.0 |
| Butyrate (molar percent): | | | |
| BD fed | 12.9 | 11.2 | |
| Control | 12.7 | | 10.4 |

Feed intake and body weight changes are given in Table 8. Control cows ate more than the BD fed cows, but the difference was slight. However, the feed intake for both groups was higher than in Trial 1. BD fed cows lost weight while control cows gained weight. This suggests that the increased milk fat production for the BD fed group could be associated with increased adipose fat mobilization or with decreased adipose deposition. One problem associated with feeding high concentrate diets has been the overfattening of lactating cows, and BD seems quite helpful in preventing this.

TABLE 8

Effects on feed intake and body weight change from feeding 1,3-butanediol to prevent milk fat depression Group: BD comparison period only
Air dry feed intake (kg./cow/day):
  BD fed _____ 17.7
  Control _____ 18.4
Body weight change (kg./cow/day):
  BD fed _____ —0.17
  Control _____ +0.52

An overall evaluation of this trial substantiates the conclusion that BD acts as a preventative for milk fat depression. The greater number of cows in this trial and the more uniform response of both groups, particularly the controls, enabled the milk fat production data to attain statistical significance.

I claim:
1. The method of controlling milk fat depression in lactating dairy cows being fed a fat depressing diet characterized by low roughage and high grain content, which comprises orally administering to said cows an amount of 1,3-butanediol effective for controlling said milk fat depression.

2. The method of claim 1 wherein the 1,3-butanediol is administered in admixture with the fat depressing feed rations being fed to said cattle.

3. The method of claim 1 wherin said effective amount ranges from 0.01 to 0.5 lbs. 1,3-butanediol per 100 lbs. body weight of said cows per 24 hours.

4. The method of claim 1 wherein said effective amount is from 0.1 to 0.3 lbs. 1,3-butanediol per 100 lbs. body weight of said cows per 24 hours.

5. The method of treating milk fat depression in lactating dairy cows, which comprises orally administering to dairy cows manifesting milk fat depression an effective amount up to 0.5 lbs. of 1,3-butanediol per 100 lbs body weight of said cows per 24 hours until said milk fat depression is corrected.

6. The method of claim 5 wherein the 1,3-butanediol is administered in an amount of from 0.1 to 0.3 lbs. per 100 lbs. body weight of said cows per 24 hours.

7. The method of claim 5, which comprises first administering the 1,3-butanediol in a treatment an effective amount up to 0.5 lbs. per 100 lbs. body weight of said cows per 24 hours for a period of from 3 to 6 days; and thereafter administering the 1,3-butanediol in an amount from 0.01 to 0.3 lbs. per 100 lbs. body weight of said cows per 24 hours.

8. The method of claim 5, which comprises first administering the 1,3-butanediol in an amount ranging from 0.1 to 0.3 lbs. per 100 lbs. body weight of said cows per 24 hours; and thereafter administering the 1,3-butanediol in an amount from 0.1 to 0.2 lbs. per 100 lbs. body weight of said cows per 24 hours.

References Cited

Miller: Chem. Abst., vol. 63 (1965), p. 18730c.
Miller et al.: Chem. Abst., vol. 60 (1964), p. 9681a.

SAM ROSEN, Primary Examiner